United States Patent
Hamby, Jr.

[11] Patent Number: 5,832,975
[45] Date of Patent: Nov. 10, 1998

[54] TREE DELIMBING DEVICE

[76] Inventor: Thomas E. Hamby, Jr., 1776 Arbor Grove Church Rd., Purlear, N.C. 28665

[21] Appl. No.: 910,619

[22] Filed: Aug. 13, 1997

Related U.S. Application Data

[62] Division of Ser. No. 714,186, Sep. 16, 1996, Pat. No. 5,704,407.

[51] Int. Cl.$^6$ .............................. A01G 25/02; B27B 1/00
[52] U.S. Cl. .......................... 144/24.13; 83/368; 83/370; 144/343; 144/357
[58] Field of Search ........................ 364/474.09; 83/360, 83/368, 370; 144/41, 24.13, 335, 338, 343, 382, 357

[56]  References Cited

U.S. PATENT DOCUMENTS

| | | |
|---|---|---|
| 3,183,949 | 5/1965 | Larson . |
| 3,398,774 | 8/1968 | Hahn . |
| 3,443,611 | 5/1969 | Jorgensen . |
| 3,572,410 | 3/1971 | McElderry . |
| 3,596,690 | 8/1971 | Hamilton et al. . |
| 3,643,708 | 2/1972 | Lindblom . |
| 3,690,351 | 9/1972 | Strickland et al. . |
| 3,720,247 | 3/1973 | Lindblom ............................. 144/24.13 |
| 3,735,786 | 5/1973 | Vit . |
| 3,763,904 | 10/1973 | Eynon . |
| 3,797,539 | 3/1974 | Moser et al. . |
| 3,809,134 | 5/1974 | McCabe . |
| 3,881,532 | 5/1975 | Jouppi . |
| 3,905,407 | 9/1975 | Guy et al. . |
| 3,974,866 | 8/1976 | Sarrenketo . |
| 3,981,336 | 9/1976 | Levesque . |
| 4,034,785 | 7/1977 | Tucek . |
| 4,049,032 | 9/1977 | Oldenburg et al. . |
| 4,050,486 | 9/1977 | Whitcomb . |
| 4,083,463 | 4/1978 | Ericsson . |
| 4,114,666 | 9/1978 | Brunn . |
| 4,116,249 | 9/1978 | Högberg et al. . |
| 4,124,047 | 11/1978 | Dressler et al. . |
| 4,194,542 | 3/1980 | Eriksson . |
| 4,250,935 | 2/1981 | Helgesson et al. . |
| 4,258,762 | 3/1981 | Belanger . |
| 4,462,438 | 7/1984 | Gandreault . |
| 4,569,379 | 2/1986 | Gemmell-Murdoch . |
| 4,620,578 | 11/1986 | Verrill et al. . |
| 4,742,854 | 5/1988 | Forslund . |
| 4,749,012 | 6/1988 | Hamby, Jr. . |
| 4,766,939 | 8/1988 | Forsliund . |
| 4,815,506 | 3/1989 | Kainz . |
| 4,898,218 | 2/1990 | Linderholm . |
| 4,898,219 | 2/1990 | Pomies ............................... 144/24.13 |
| 4,899,794 | 2/1990 | Hamby, Jr. . |
| 5,097,881 | 3/1992 | Mack . |
| 5,515,895 | 5/1996 | Hamby, Jr. . |
| 5,704,407 | 1/1998 | Hamby, Jr. ............................. 144/357 |

FOREIGN PATENT DOCUMENTS 343391   6/1972   Sweden .

Primary Examiner—W. Donald Bray
Attorney, Agent, or Firm—Bell Seltzer Intellectual Property Law Group of Alston & Bird LLP

[57]  ABSTRACT

A tree delimbing device having a self-aligning cutter head for delimbing a tree stem which is mounted on a frame by a rotational and pivotal support. A substantially inelastic flexible member connects the cutter head to the frame to limit movement of the cutter head. A medial portion of the flexible member is connected to a fluid cylinder so as to urge the cutter head toward a centered position. An accumulator may be provided for regulating the pressure of the fluid in the cylinder. The positioning of the fluid cylinder may be adjustable. A tree stem diameter measuring device having a sliding position indicator may also be provided. A tree stem detector may also be included to sense the presence of a tree stem placed within the cutter head for automatically closing and opening the blades around the stem. A removable mount for the cutter head is also included.

7 Claims, 8 Drawing Sheets

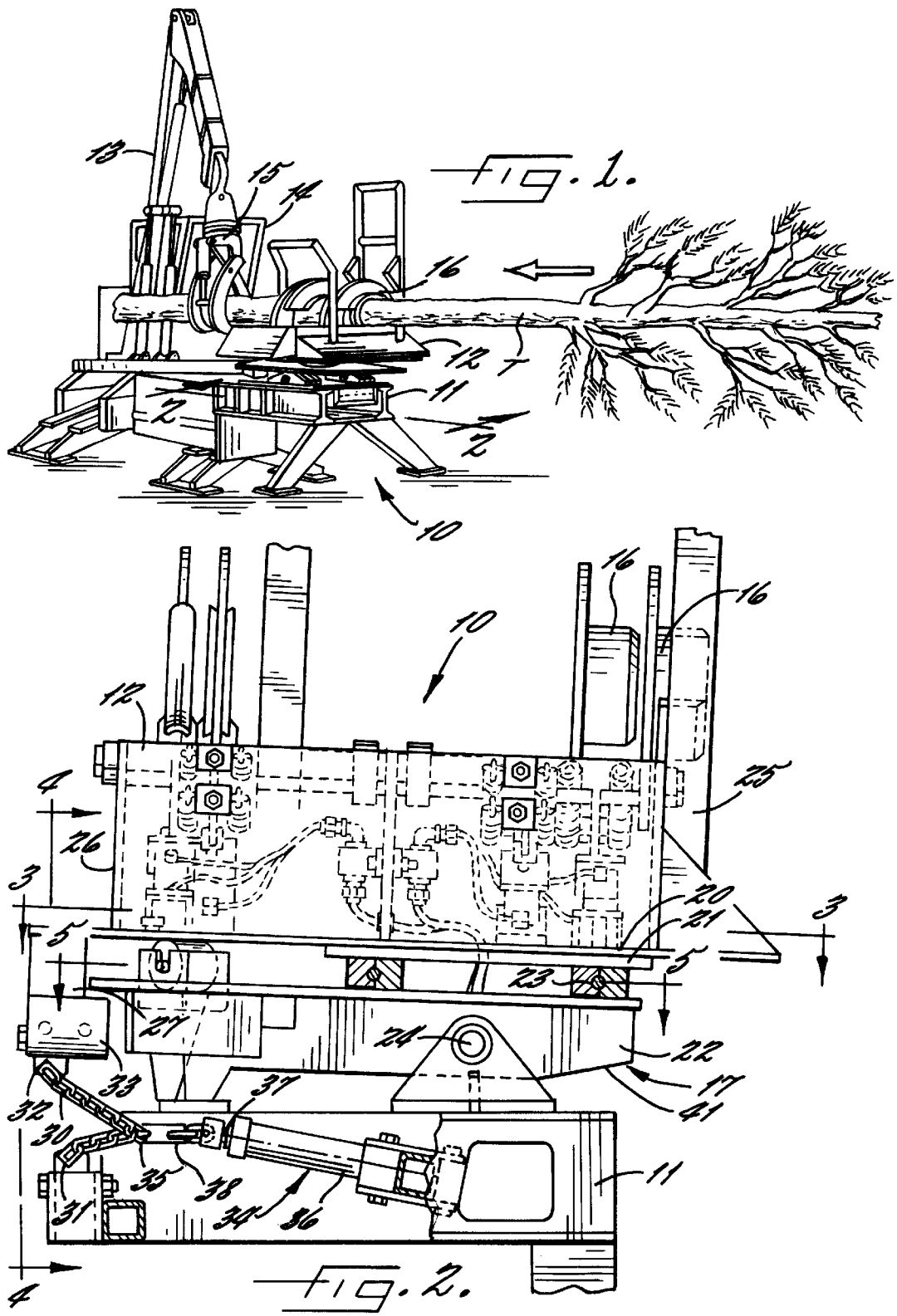

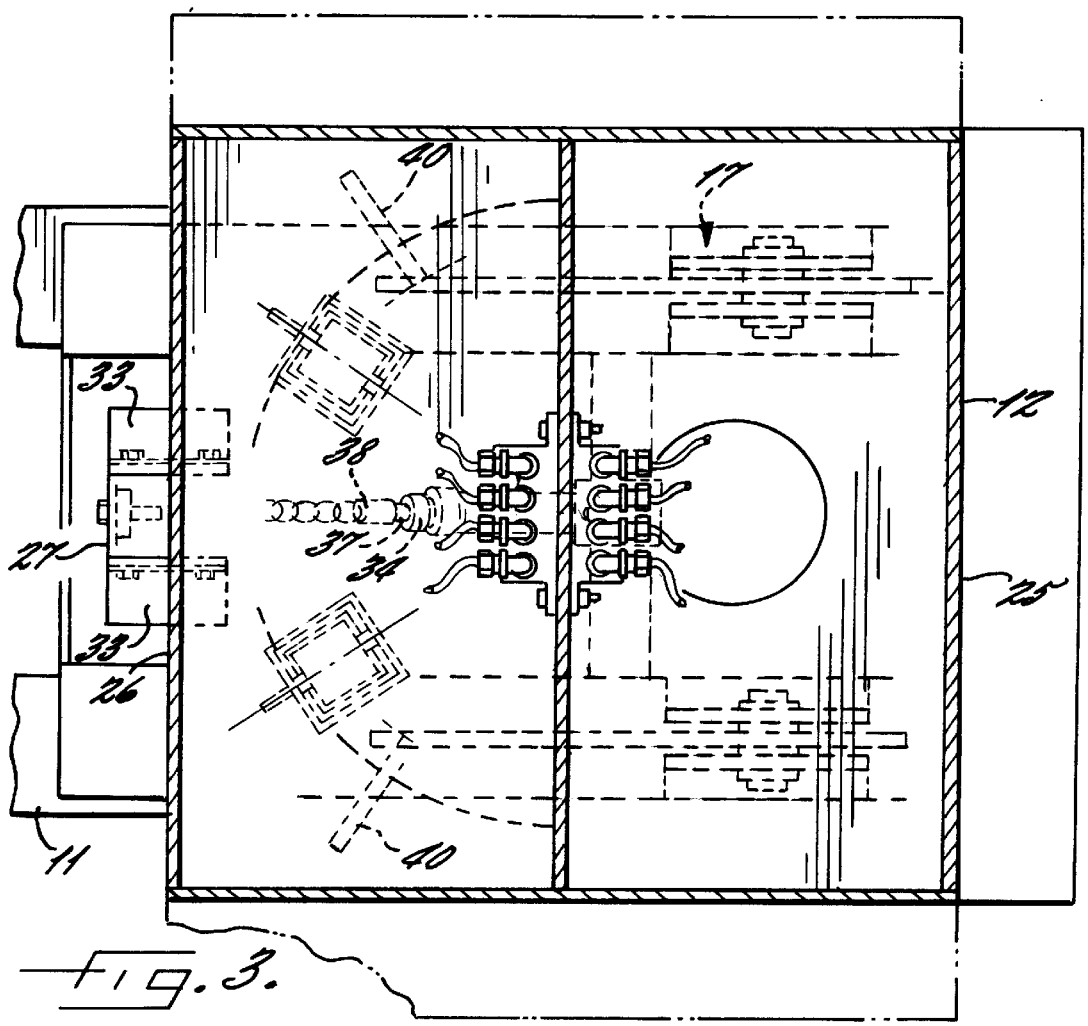
_fig. 3._
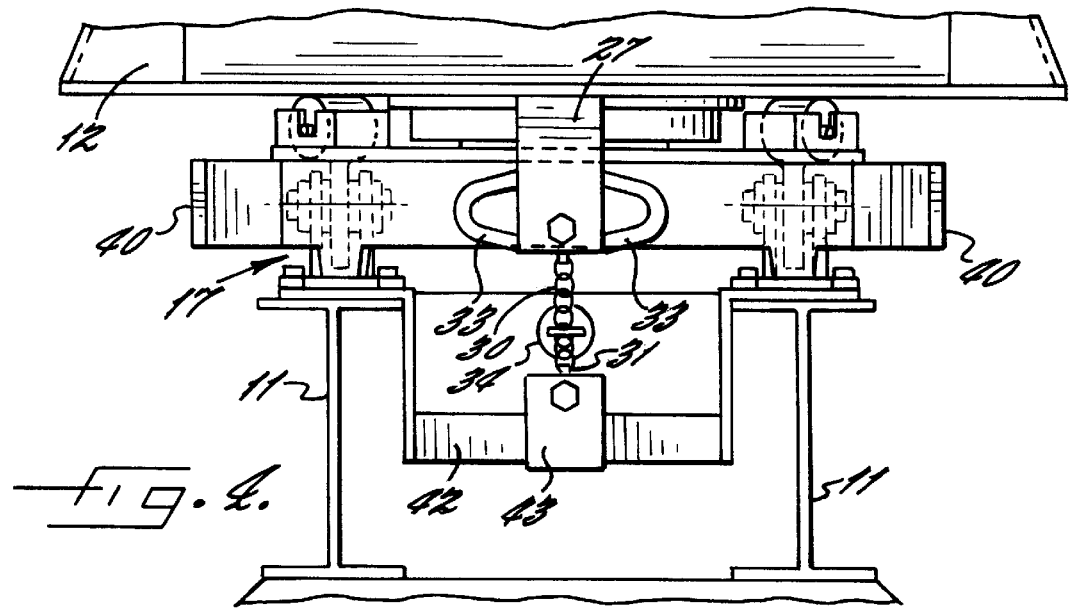
_fig. 4._

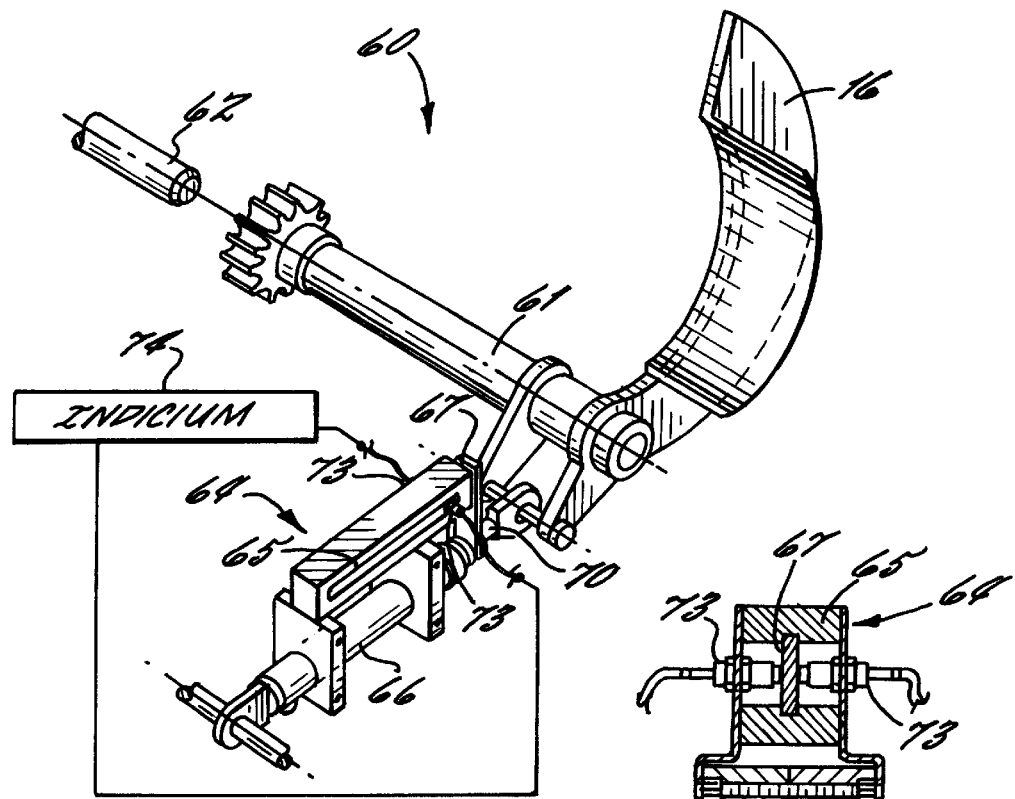
_fig. 7._
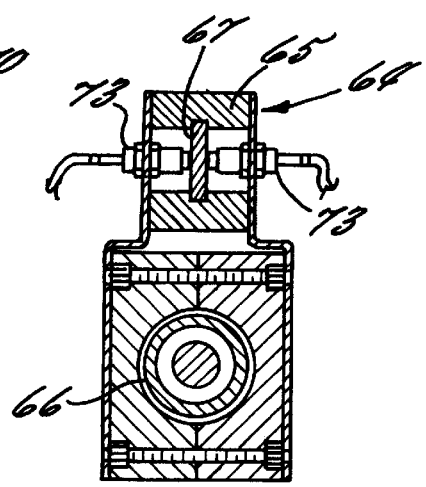
_fig. 9._
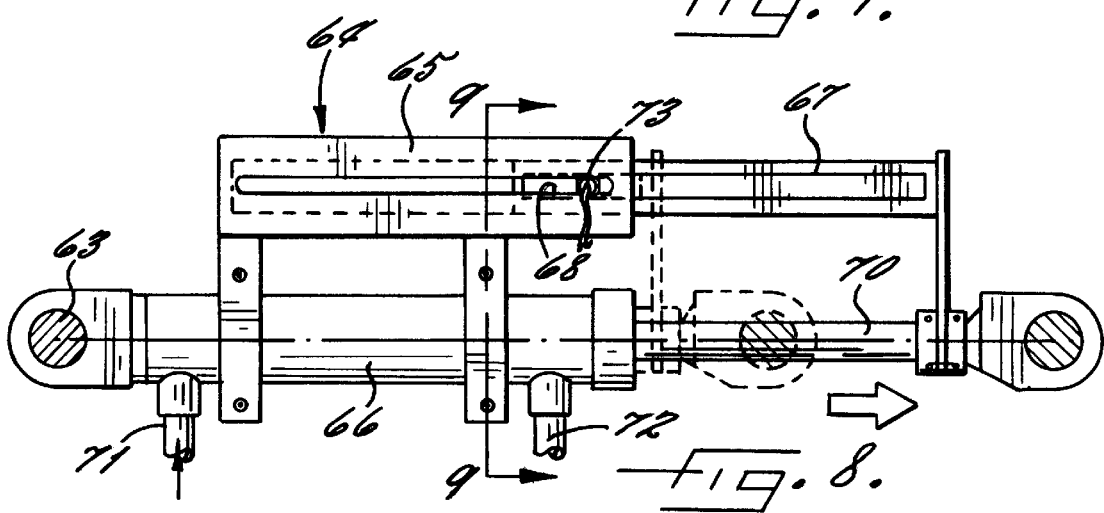
_fig. 8._

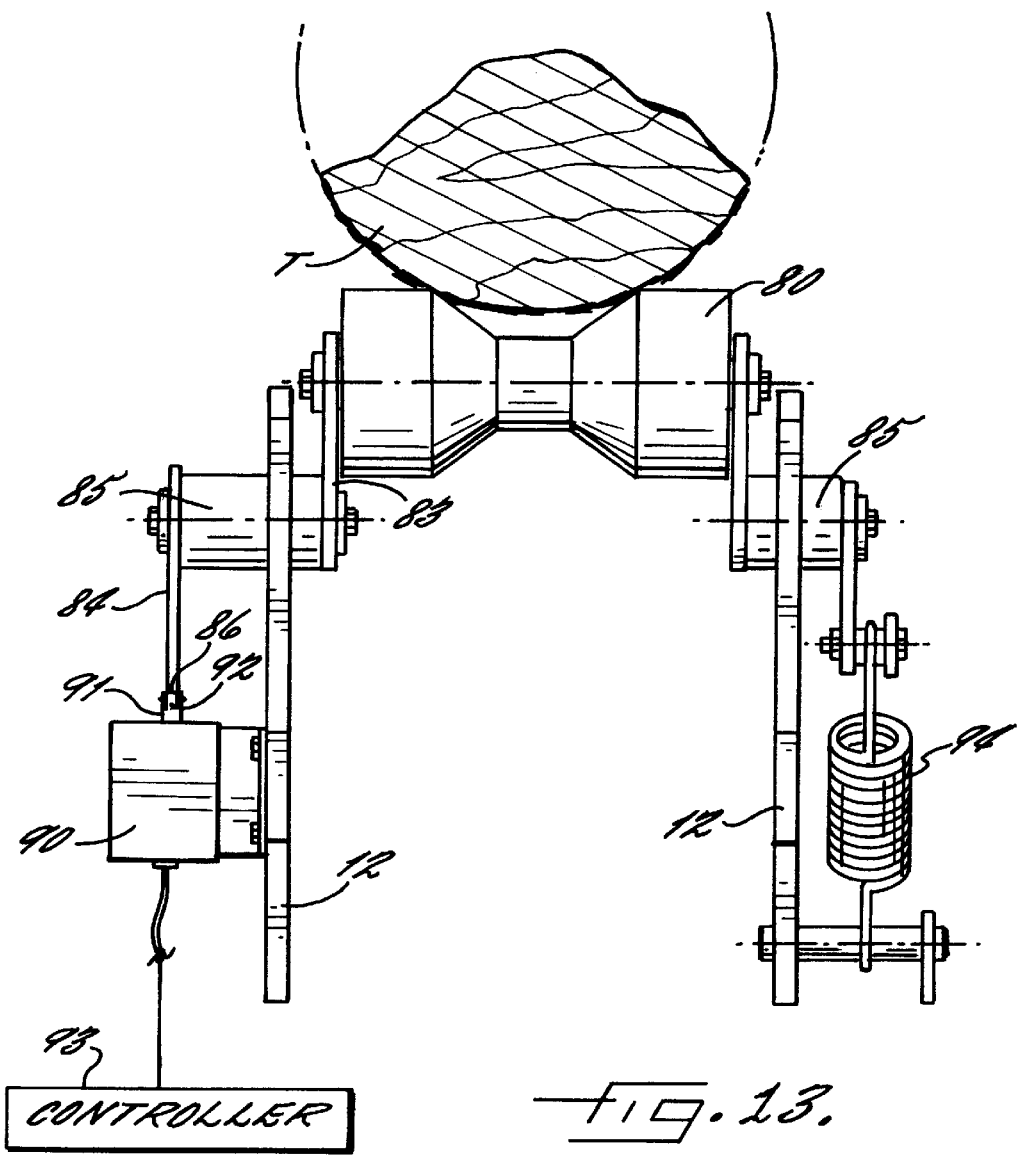

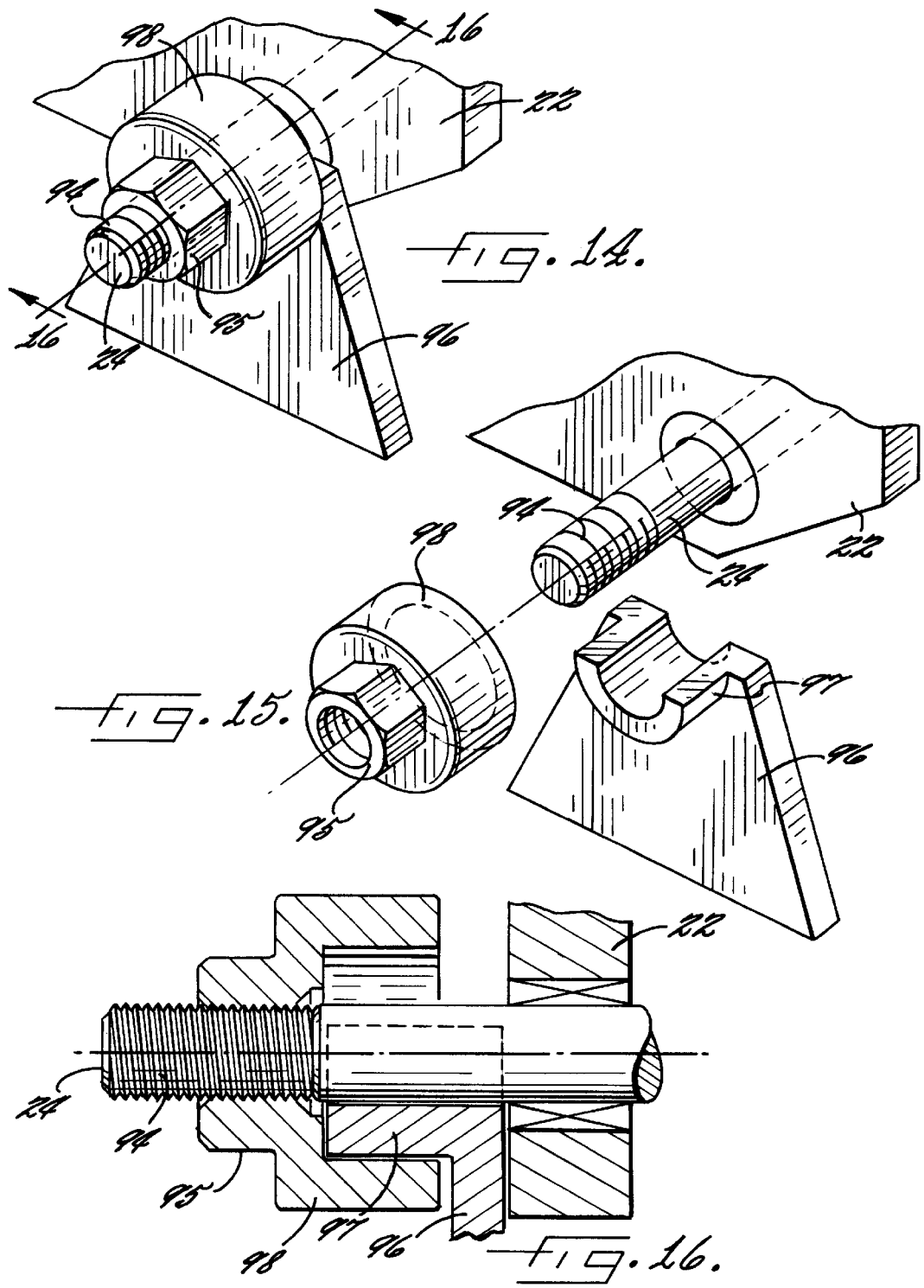

TREE DELIMBING DEVICE

This application is a divisional of application Ser. No. 08/714,186, filed Sep. 16, 1996, now U.S. Pat. No. 5,704,407.

FIELD OF THE INVENTION

The invention relates generally to a cutter head for delimbing trees and a mount therefor. In particular, the invention relates to a tree delimbing device having limb cutting and stripping blades and a support mount for allowing the cutter head to move as the tree stem passes through the cutter head. The invention also relates to means for measuring a tree stem received within the cutter head, means for automatically closing and opening the cutting and stripping blades, and to a removable mount for the cutter head.

BACKGROUND OF THE INVENTION

Delimbing trees by encircling the tree stem, or bole, with cutting blades and moving the blades along the length of the tree is known. For example, the delimbing device may form a part of a tree harvester that is supported for vertical movement on a track. Alternatively, the delimbing device may move along a track while a tree is held in a horizontal position; or the delimbing device may remain fixed while a tree is pulled past a stationary cutter head. Examples of some such prior art delimbing devices are described in commonly-owned U.S. Pat. Nos. 4,749,012 and 5,515,895, both of which are expressly incorporated herein by reference.

In tree delimbers of the type having a stationary cutter head assembly through which the tree stem is pulled by an operator, it is desirable that the cutter head be pivotally and/or rotationally mounted to allow for inaccuracies in the movement of the tree stem when the operator pulls the tree stem through the cutter head. This feature has been found desirable because an operator typically uses the grapple head of a knuckle boom loader to grasp one end of the tree stem so as to pull the stem through the cutter head. It is sometimes difficult to pull the tree stem in a precisely longitudinal direction; moreover, some tree stems are curved such that the cutter head must follow the curve in order to properly delimb the tree stem. It has also been found desirable to restrict the pivotal and/or rotational movement of the cutter head to a desired range, and further, to include means for urging the cutter head to return to a generally centered position after a delimbing operation has been completed, so that the cutter head will be ready to receive a subsequent tree stem for delimbing.

Commonly-owned U.S. Pat. No. 4,749,012 discloses a self-aligning cutter head assembly for delimbing trees in which curved cutting and limb stripping blades are carried by a cutter head that is supported for pivotal movement in both the vertical and horizontal planes so that the limb stripping blades are automatically maintained parallel with the longitudinal axis of the tree as the tree is pulled through the cutter head by the grapple head of the knuckle boom loader. In this device, the pivotal support in both the vertical and horizontal planes for the cutter head support frame is provided by a "fifth wheel" connection in which pivot pins providing for vertical and horizontal movement are spaced close together and are both located beneath the rectangular frame of the cutter head. A chain assembly limits the movement in the horizontal and vertical planes. The chain assembly includes a length of chain interconnecting a portion of the cutter head (or a moveable support underlying the cutter head) and the mounting frame. A spring interconnects a medial portion of the chain to the mounting frame so as to exert a tensile force on the cutter head to urge the cutter head to return to a centered position after delimbing.

Commonly-owned U.S. Pat. No. 5,515,895 discloses another spring-activated means for aligning the cutter head, in which a length of chain interconnects the frame with an outer portion of a mounting plate underneath the cutter head. A second length of chain having a spring-loaded piston incorporated along its length extends from a medial portion of the first chain to another mounting position on the frame. As the cutter head is pivoted or rotated from the center position, the spring is compressed and exerts a force which urges the cutter head assembly to return to a centered position. However, if a linear spring is used, for example, the force exerted by the spring on the chain increases as the cutter head is deflected toward its outermost extreme positions. Excessive force exerted by the spring at the extreme deflection angles of the cutter head assembly could cause the delimbing blades to dig into and/or cut the side of the tree bole, which may require the operator to reverse the direction of movement of the tree bole through the cutter head so as to free the blades and then restart the pulling operation. Also, the amount of force exerted by the spring is difficult to control and may vary due to friction, wear or other factors. The force generated by the spring sometimes may not be sufficient to urge the cutter head assembly to return to a centered position following each delimbing operation. Also, the spring assembly may be expensive and difficult to fabricate.

It is also desirable to maximize the amount of useable wood that may be obtained from a tree. To this end, it has been found desirable to delimb the tree at a bole diameter of about four inches. Many harvesting operations judge the diameter of the bole visually or manually measure the bole diameter following delimbing. In many instances, an operator manually opens and closes the cutting and stripping blades and activates a topping saw during or following the delimbing operation. U.S. Pat. No. 5,515,895 shows one apparatus for visually indicating the diameter of the tree bole to an operator so as to signal when the point at which the topping saw should be manually activated. As shown most clearly in FIGS. 11 and 12 of that patent, a plurality of cam members are mounted on rotating sleeves that support the pivotal cutting and stripping blades which generally conform to the surface of the tree bole during the delimbing operation. The cam members include lobes that actuate micro-switches which are further connected to colored visual indicator lights so as to indicate the diameter of the tree bole, thus signaling to the operator the appropriate point at which the cutting and stripping blades should be opened and/or topping saw should be activated. However, it is desirable to provide an alternative, reliable and accurate means for measuring the bole diameter and for indicating the diameter of the bole to an operator.

It is has also been found desirable to actuate the tree cutting and stripping blades automatically when a tree bole has been positioned within the cutter head assembly by the operator, so that the cutting and stripping blades will be moved automatically from an open position in which the tree bole may be positioned within the cutter head assembly, to a closed position encircling the tree bole for delimbing, and for automatically opening the cutting and stripping blades if the tree bole is removed from the cutter head.

It has also been found desirable to provide a means for removably attaching the cutter head to a support frame for ease of transport.

It is therefore an object of the present invention to provide a tree delimber having an improved self-aligning cutter head which is simple in construction and inexpensive to manufacture and maintain.

Another object of the present invention is to provide an improved self-aligning cutter head and a support therefor which are particularly adapted for use in conjunction with a knuckle boom loader for drawing a tree bole in a longitudinal direction through the cutter head without requiring the knuckle boom loader operator to maintain precise longitudinal axial alignment with the cutter head assembly and for urging the cutter head assembly to a centered position.

A further object of the present invention is to provide an improved device for measuring the diameter of the tree bole and for indicating the diameter of the bole to an operator.

Still another object of the present invention is to provide a device for automatically sensing the presence of a tree bole within the cutter head and for actuating the cutting and stripping blades by moving them from an open, or inoperative, position to a closed, or operative position that encircles the tree bole for beginning a delimbing operation, and for opening the cutting and stripping blades when the tree bole is lifted from the cutter head.

Another object of the present invention is to provide a removable mount for the cutter head to facilitate ease of transport.

SUMMARY OF THE INVENTION

In accordance with the present invention, these and other objects, features and advantages are achieved by the embodiments illustrated herein by the provision of a tree delimbing device having a self-aligning cutter head and a rotatable and pivotal platform for supporting the cutter head. A frame is provided for supporting the cutter head and the mounting platform above the ground. The cutter head has limb cutting and stripping means for delimbing a tree stem, which may be, in a preferred embodiment, a plurality of cutting and stripping blades that encircle the tree bole as the tree bole is pulled through the cutter head by an operator, typically using the grapple head of a knuckle boom loader.

Means are mounted on the frame for supporting the cutter head for rotational and pivotal movement so as to maintain the cutter head in substantial alignment with a longitudinal axis of the tree stem, or bole, during delimbing. A substantially inelastic flexible member having a first end connected to the frame, and a second end connected to the cutter head, and further having a desired length, is provided for limiting the pivotal and rotational movement of the cutter head. The flexible member may be a chain, a series of rigid bars interconnected by a pin or other means, or a cable. An extensible fluid piston cylinder reaching between the frame and a medial portion of the flexible member is provided for exerting a force on the flexible member to urge the cutter head toward a centered position. The fluid piston cylinder may be a hydraulic cylinder containing hydraulic fluid.

A fluid accumulator, such as a hydraulic fluid accumulator, may also be provided, in communication with the extensible piston cylinder for regulating and maintaining a desired pressure and volume of the fluid within the cylinder. Means may also be provided for adjusting the amount of fluid pressure and volume maintained by the accumulator. The accumulator may, in a preferred embodiment, also be in communication with actuating means for moving the cutting and stripping blades.

The means mounted on the frame for supporting the cutter head for rotational and pivotal movement may include a base plate supported on a rotating frame mounting plate and being interconnected to a pivot plate by a rotational bearing member. A vertical stop member may also be provided to further limit the pivoting movement of the cutter head, and lateral stop members may be provided to further limit the rotational movement of the cutter head. Adjustment means may also be provided for adjusting the positioning of the mounting of the extensible piston cylinder on the frame. The cutter head may be removable from the support frame by provision of open saddles supporting the pivot axles and removable nuts which may be threaded on to the axles. The nuts include flanges which underlie saddle flanges to hold the cutter head in place.

The means for limiting the rotational and pivotal movement of the cutter head and for urging the cutter head toward a centered position may be mounted on the frame and the cutter head at three positions. The means may include a flexible member extending between two of said positions and an extensible hydraulic piston cylinder reaching from one of said mounting positions to a medial point on the flexible member. The piston cylinder exerts a force on the flexible member to urge the ends of the flexible member toward one another, thus urging the cutter head into a desired position.

A tree stem diameter measuring device is also provided, preferably within the cutter head. The tree stem diameter measuring device includes a frame, a shaft mounted on the frame, and at least one lever for contacting a surface of a tree stem. The lever may be rotationally mounted on the shaft so that a portion of the lever may move into contact with a surface of the tree stem. A sliding position indicator having first and second slide members is also provided. The first slide member is fixedly mounted on the frame, and the second slide member is connected to a portion of the lever such that the second slide member moves relative to the first slide member as the lever rotates about the shaft. At least one sensor means is located on the sliding position indicator for detecting the relative positions of the first and second slide members. A plurality of sensors, for example, three sensors, may be used to indicate multiple stem diameters. The sensor is preferably magnetic, although optical, photoelectric or other sensor means may be used.

The lever to which the position indicator is affixed may be a cutting and limb stripping blade in a tree delimbing device. The sliding position indicator may be mounted on actuator means such as a hydraulic cylinder for rotating the lever towards and away from a tree stem. In a preferred embodiment, the first and second slide members of the position indicator move in a linear path. The sensor means may activate one or more lights, a light bar, or other indicia for indicating to an operator that a desired bole diameter has been reached.

The tree delimbing device may also include means for automatically moving the limb cutting and stripping means, or blades, from an open position for receiving a tree stem, to a closed position for delimbing, and for again opening the blades. This apparatus may include means for detecting a portion of a tree stem received in a path defined by the cutter head for receiving a tree stem. The detecting means may further include actuating means for actuating the means for moving the limb cutting and stripping means. In a preferred embodiment, the tree stem detecting means comprises a probe mounted on a cam rotatably mounted on the cutter head such that the probe extends into the path for receiving a tree stem. The probe is moved, or depressed, by contact with a tree stem when a stem is placed in the path. A plunger valve is positioned in contact with the cam surface and is moved between an open and a closed position by motion of the cam. Hydraulic means is also provided for moving the cutting and stripping blades. The opening and closing of the plunger valve controls the operation of the hydraulic lever moving means.

BRIEF DESCRIPTION OF THE DRAWINGS

The foregoing and other objects, advantages and features of the invention, and the manner in which the same are accomplished, will become apparent from the following detailed description of the invention taken in conjunction with the accompanying drawings which illustrate preferred and exemplary embodiments, wherein:

FIG. 1 is a perspective view of a cutter head assembly supported on one end of a knuckle boom loader, in which a tree stem is shown being pulled through the cutter head by the grapple head of a knuckle boom loader;

FIG. 2 is a fragmentary side elevation view of the frame and cutter head taken generally along line 2—2 of FIG. 1, illustrating a manner in which the cutter head may be pivotally and rotationally supported on the frame;

FIG. 3 is a plan view of the rotational and pivotal cutter head support structure taken along line 3—3 of FIG. 2;

FIG. 4 is a partial rear elevation view of the cutter head, pivotal and rotational cutter head support, and depending frame structure taken generally along 5—5 of FIG. 2;

FIG. 7 is a perspective view of the tree stem diameter measuring and indicating means of the present invention;

FIG. 8 is an elevation view of the cutting and stripping means actuator and sliding position indicator of the present invention;

FIG. 9 is a cross-section view of the cutting and stripping means actuator and sliding position indicator, taken generally along line 9—9 of FIG. 8;

FIG. 13 is an end elevation view of the tree stem sensing and blade actuator means in contact with a tree stem;

FIG. 14 is an enlarged perspective view of a removable pivot axle and saddle for interconnecting the cutter head and support frame;

FIG. 15 is an enlarged perspective view of the removable pivot axle and saddle; and FIG. 16 is a cross-section view taken along line 16—16 of FIG. 14.

DESCRIPTION OF THE PREFERRED EMBODIMENTS

Figure 5:
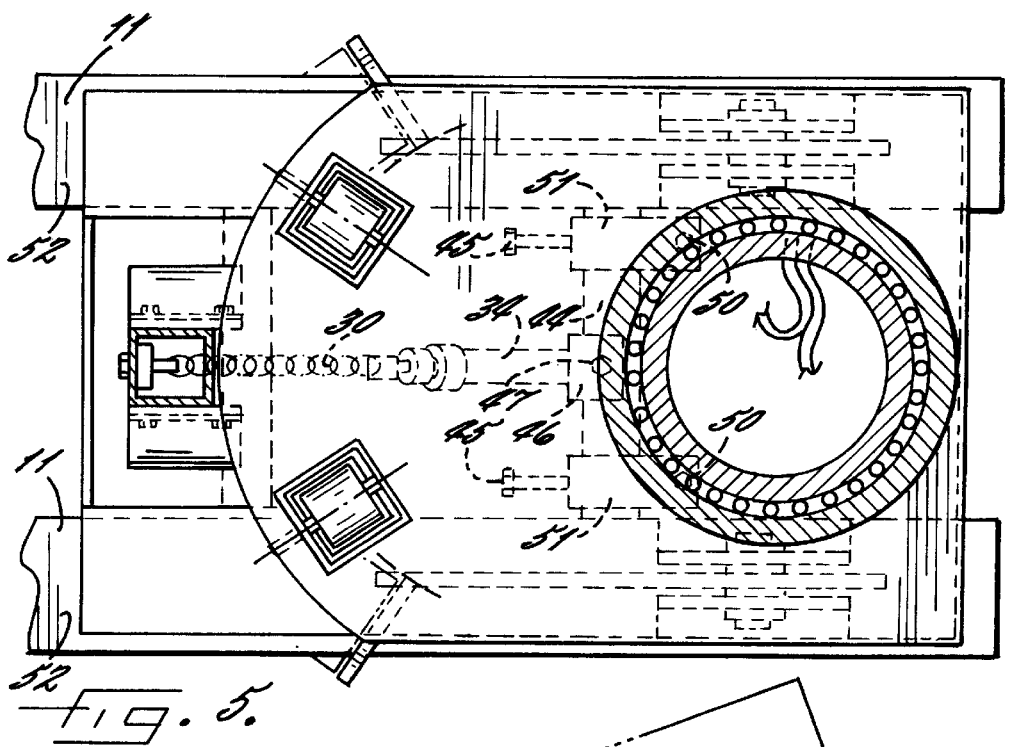
FIG. 5 is a plan cross-sectional view of the pivotal and rotational support for the cutter head assembly and of the depending frame, including an illustration of the bearing means and of the means for limiting the rotational and pivotal movement of the cutter head and for urging the cutter head toward a centered position, taken generally along line 5—5 of FIG. 2.

In accordance with the present invention and referring now to the drawings, FIG. 1 shows a tree delimbing device indicated generally at 10, within which a bole, or stem, of a tree T is received. The tree delimbing device shown herein includes a frame 11 and a cutter head 12 mounted thereon. Also shown mounted on the frame 11 in FIG. 1 is a knuckle boom loader 13, an operator cab 14, and a grapple head 15 which may engage the stem or bole of the tree T to pull it through the cutter head 12 for delimbing. Alternative embodiments of the invention may omit the knuckle boom loader 13, grapple head 15 and operator cam 14, such that the frame 11 and cutter head 12 may form a separate unit.

As shown in FIGS. 1 and 2, limb cutting and stripping means, which in a preferred embodiment is at least one and preferably a plurality of limb cutting and stripping levers or blades 16, is mounted on the cutter head 12 for use in delimbing a tree stem. The basic function and operation of the limb cutting and stripping blades 16 and many other components of the cutter head 12 may be substantially as described in commonly-owned prior U.S. Pat. No. 5,515, 895.

The cutter head 12 is preferably self-aligning for facilitating ease of use by an operator using the grapple head 15 or other suitable means to pull a tree T through the cutter head 12. As shown in FIG. 2, the cutter head 12 may be mounted to the frame 11 via mounting means 17 which is itself mounted on the frame 11 and which supports the cutter head 12 for rotational and pivotal movement so as to maintain the cutter head 12 in substantial alignment with a longitudinal axis of a tree bole T during delimbing. In the embodiment shown in FIG. 2, the means for rotationally and pivotally supporting the cutter head 12 includes a base plate 20 that is supported on a rotating frame mounting plate 21. The plate 21 is interconnected to a pivot plate 22 by a rotational bearing member 23. The pivot plate 22 is mounted to the frame 11 by a pivot axle 24, which preferably has an axis in a substantially horizontal direction so that the front end 25 of the cutter head 12 and the rear end 26 of the cutter head 12 may move upwardly and downwardly as a tree stem T is pulled through the cutter head 12. A rotational bearing member 23 permits rotation about a substantially vertical (or, in a preferred embodiment, slightly offset from vertical, as shown in FIG. 2) axis as the tree stem T is pulled through the cutter head 12.

The base plate 20 of the cutter head 12 may include a depending downward projecting connection arm 27 which protrudes adjacent one side of the pivot plate 22. A substantially inelastic flexible member 30, which may, by way of example but without limitation, be formed by one or more lengths of chain, cable, or pinned rigid bars, extends between the connection arm 27 and the frame 11, such that a first end 31 of the flexible member 30 is connected to the frame 11. A second end 32 of the flexible member 30 is connected to the connection arm 27 or to some other suitable portion of the cutter head 12. Alternatively, the second end 32 may be affixed to another portion of the base plate 20 or, in an alternative embodiment, to another portion of the mounting means 17 as may be suitable for obtaining and realizing the advantages of the invention. The flexible member 30 has a desired length for limiting the pivotal and rotational movement of the cutter head 12 relative to the frame 11.

Also provided for restricting the rotational movement of the cutter head 12 are bumpers 33 positioned on each side of the downwardly extending connection arm 27, or which may be located on a suitable portion of the cutter head 12 or base plate 20 adjacent either or both of the ends 25 and 26 thereof.

An extensible fluid piston cylinder 34 reaches between the frame 11 and a medial portion 35 of the flexible member 30.

In a preferred embodiment, the cylinder housing 36 is affixed to the frame 11. The piston 37 of the cylinder 34, which is extensible from cylinder housing 36, may be affixed either directly or via a linkage 38, which may be a length of chain, another flexible member, or other suitable connection means, to the medial portion 35 of the chain 30. The cylinder 34 contains a fluid, such as hydraulic fluid, which may be of one or more types readily known and used. Alternatively, a pneumatic cylinder may be used.

The piston cylinder 34 is arranged so as to exert a tensile force on the flexible member 30 as the cutter head 12 is rotated and/or pivoted from a stationary centered position, in which the tree path defined by the cutter head 12 is preferably axially aligned with the frame 11. The force exerted by the cylinder 34 urges the cutter head 12 toward the centered position when it is deflected. In this manner, the tree delimbing device 10 may be provided with a self-aligning cutter head.

In a preferred embodiment, a fluid accumulator (not shown) of a commonly known and available type, such as a hydraulic accumulator, is provided in communication with the extensible piston cylinder 34 for regulating and maintaining the pressure and/or volume of a fluid such as hydraulic fluid within the cylinder 34. The accumulator may be adjustable such that the volume of fluid and/or pressure of fluid maintained by the accumulator may be adjusted to a desired level. In one particularly preferred embodiment, the accumulator is also in communication with the hydraulic cylinders for opening and closing the cutter blades, as described below.

As shown in FIGS. 3 and 4, fixed stop members 40 may be provided for interacting with the bumpers 33. The bumpers 33 and stop members 40 form lateral stops which further limit the rotational movement of the cutter head 12. Also, a vertical stop member 41 is provided which may extend downwardly from the pivot plate 22 so as to abut a portion of the frame 11 for limiting the pivoting movement of the cutter head 12.

Referring to FIG. 3, the cutter head 12 overlies the mounting means 17 and the frame 11 with the cylinder 34 extending generally parallel to the longitudinal axis of the frame 11 underneath a central portion of the cutter head 12 when the cutter head 12 is at rest in a centered position. The linkage 38 between the piston 37 and flexible member 30 extends further outwardly from the cylinder 34. Referring now to FIG. 4, which is a rear elevational view of the mounting means 17, frame 11, cutter head 12 and cylinder 34, the flexible member 30 extends from a frame interconnecting structure 42 which may reach between lateral sides of the frame 11. A center mount 43 is provided for receiving first end 31 of the flexible member 30 directly underneath the connection arm 27 when the cutter head 12 rests in a centered position.

FIG. 5 shows the cylinder 34 affixed to the frame 11 by an adjustable mounting means 44, which may be moved relative to the frame 11 so as to adjust the mounting position of the extensible piston cylinder 34 on the frame 11. Adjusting screws 45 are provided on each side of a cylinder mounting bracket 46 to which the cylinder 34 is attached. Preferably, the cylinder 34 is attached to the mounting bracket 46 by a pinned connection 47 or other suitable pivotal means. Holding tracks 51 may be affixed to the side members 52 of the frame 11. Thus, the screws 45 may be turned to adjust the positioning of the cylinder mounting bracket 46 forwardly and/or rearwardly within the confines of the frame 11 so as to adjust the positioning of the mounting of the cylinder 34.

When the mounting of the cylinder 34 is a desired point, lock nuts 50 on the holding tracks 51 may be tightened to securely fasten the cylinder 34 into place.

Figure 6:
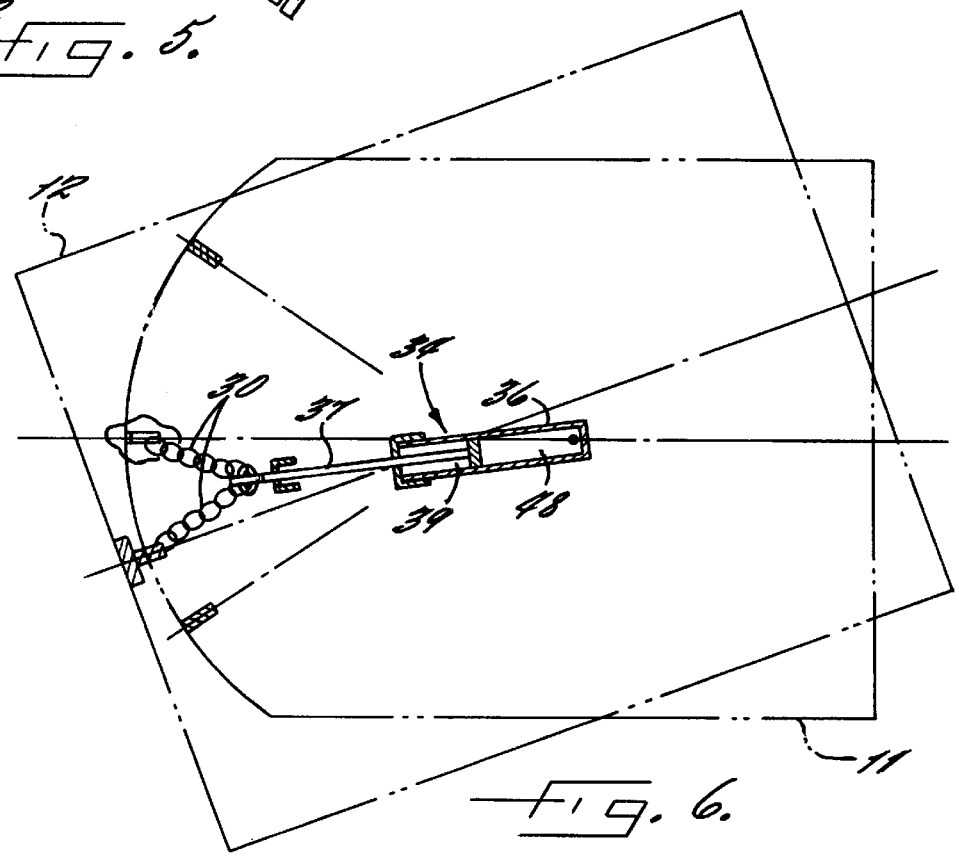
FIG. 6 is an isolated schematic plan view of the means for limiting rotational and pivotal movement of the cutter head and for urging the cutter head toward a centered position.

As illustrated in FIG. 6, the cylinder housing 36 is pivotally mounted to the mounting bracket 46 so as to allow the cylinder 34 to pivot relative to the frame 11 as the cutter head 12 is rotated and/or pivoted. Thus, the flexible member 30 exerts a centering force tending to urge the cutter head 12 into a centered position whenever the cutter head 12 is deflected as a result of a force generated by the piston cylinder 34. The cylinder 34 is biased by means of the accumulator to urge the piston 37 to retract, thus drawing the flexible member 30 towards the cylinder 34 to retain the cutter head 12 in a centered position.

In a preferred embodiment, a hydraulic fluid or oil pressure of about 600 pounds is utilized within the accumulator and the outside chamber 39 of the cylinder 34. A range of between about 500 and 800 pounds has been found desirable under various circumstances. A back pressure of preferably about 100 pounds per square inch may also be maintained in the back chamber 48 of the cylinder 34, although this back pressure, if used at all, may range between about 100 and 300 pounds.

The hydraulic aligning means described herein is an improvement over prior apparatus because it is less expensive to manufacture and may include fewer parts than prior art units. Moreover, the present invention is more reliable in the field because the tension generated by the cylinder 34 may be closely regulated and may, if desired, remain substantially constant. Also, the hydraulic pressure within the cylinder 34 and the cylinder 66 for opening and closing the cutting and stripping blades may be maintained in a desired relationship by the accumulator. Also, variations in tension which might occur if a spring tension unit were used can be eliminated by use of fluid tension means. In addition, the adjustment feature described hereinabove provides for easy adjustment in the event that the cutter head 12 fails to align properly.

Referring now to FIGS. 7–10, a tree stem diameter measuring device is provided, indicating generally at 60, which may be particularly useful when mounted on the cutter head 12. The measuring device acts in cooperation with the limb cutting and stripping means, such as limb cutting and stripping blades 16, for encircling a portion of a tree bole or stem.

Figure 10:
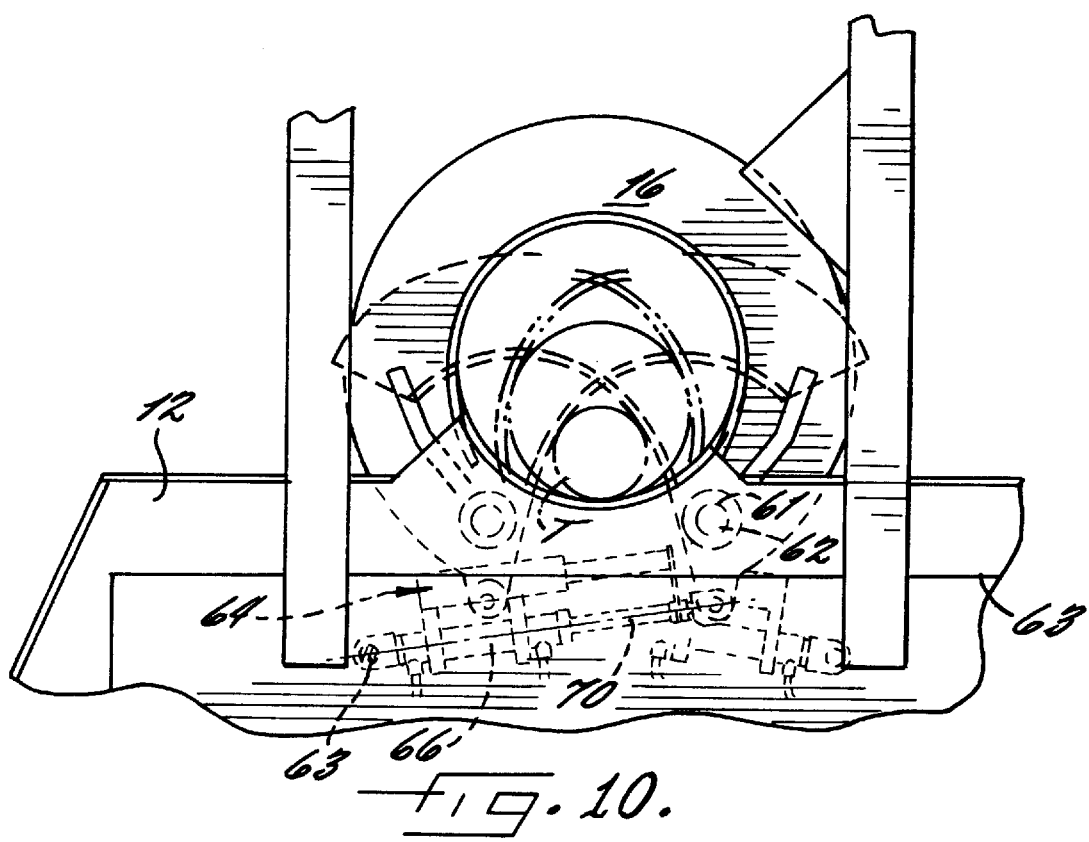
FIG. 10 is an end view illustrating the limb cutting and stripping levers encircling a tree bole.

As shown in FIGS. 7 and 10, the limb cutting and stripping blades 16 are mounted via a sleeve 61 to a shaft 62 which is mounted to the frame 63 of the cutter head 12. At least one lever or blade 16 is provided; however, multiple blades 16 are preferably used. The blade 16 is mounted as a lever on the sleeve 61 and shaft 62 so that a portion of the blade 16 may move into contact with a surface of the tree stem.

A sliding position indicator 64 is provided for detecting the position of the blade 16. Referring now to FIGS. 8 and 9, the position indicator 64 includes a first slide member 65 which is preferably fixedly mounted on the frame 63. In a preferred embodiment, the first slide member 65 is mounted on at least one actuator cylinder 66 which extends between a portion of the frame 63 and a portion of the blade 16 for urging the blade 16 toward and away from the tree stem T. The position indicator 64 also includes a second slide member 67 which is connected to a portion of the blade 16 in such a manner that the second slide member 67 moves relative to the first slide member 65 when the blade 16 rotates about the shaft 62. The second slide member 67 may be affixed to the blade 16 via a portion of a moveable piston 70 extending from the actuator cylinder 66. As shown in FIG. 9, the second slide member 67 may be received within the first slide member 65 and may be contained by an enclosure defined by the first slide member 65.

The actuator cylinder 66 may be in communication with a source of hydraulic or pneumatic fluid (not shown) and the accumulator (not shown) via communicating lines 71 and 72. One, or both, of the cylinders 66, as shown in FIG. 10, may be fitted with position indicators 64.

At least one sensor means 73 is provided on the position indicator 64 for detecting the relative positions of the first and second slide members 65 and 67. In a preferred embodiment, the sensor means 73 is a magnetic detector for sensing the presence or absence of a ferromagnetic material such as iron or steel, of which the slide member 67 may be made. Optical or photoelectric sensors, as well as other sensing means that will be apparent to those of skill in the art, may also be used. Multiple sensors 73 may be installed on the indicator 64. Three are used in one preferred embodiment for indicating three stem diameters.

The sensor means 73 may be mounted on the first slide member 65 so as to detect the position of the second slide member 67. The second slide member 67 may be a slotted metal bar, and the first slide member 65 may be a nylon or other plastic structure. A slot 68 is formed in the member 67 so that the sensor 73 is actuated when the blade 16 reaches a desired position. Various configurations of slot 68 and sensors 73, including multiple combinations thereof, may be used.

In one embodiment, the slide members 65 and 67 move in a linear path; however, curved or arcuate paths or other paths may be used as desired to achieve the advantages of the invention. A linear slide position indicator 64 is particularly advantageous because it can be mounted collinear to the actuating cylinder 66 and extensible piston 70 that are used in the cutter head 12 for moving the cutting and limb stripping blades 16. The cylinder 66 may underlie the position indicator 64, although other arrangements are also contemplated and will be readily apparent from the description herein.

As shown in FIG. 9, emitter and/or detector portions of the sensor means 73 may, if necessary, be positioned on either side of the second slide means 67 within the position indicator 64. The emitter and/or receiver portions of the sensor means 73 may be connected electrically to an indicium 74 as shown in FIG. 7, for indicating the diameter of the tree stem received within the blades 16. The indicium 74 may comprise lights (or a light bar) or other means, for displaying the bole diameter information to an operator.

Referring to FIG. 10, the blades 16 are shown in a position encircling a tree bole T received within the cutter head 12. The cylinders 66 are shown together with the position indicators 64 and the shafts 62 with sleeves 61 thereon for supporting the blades 16.

Figure 11:
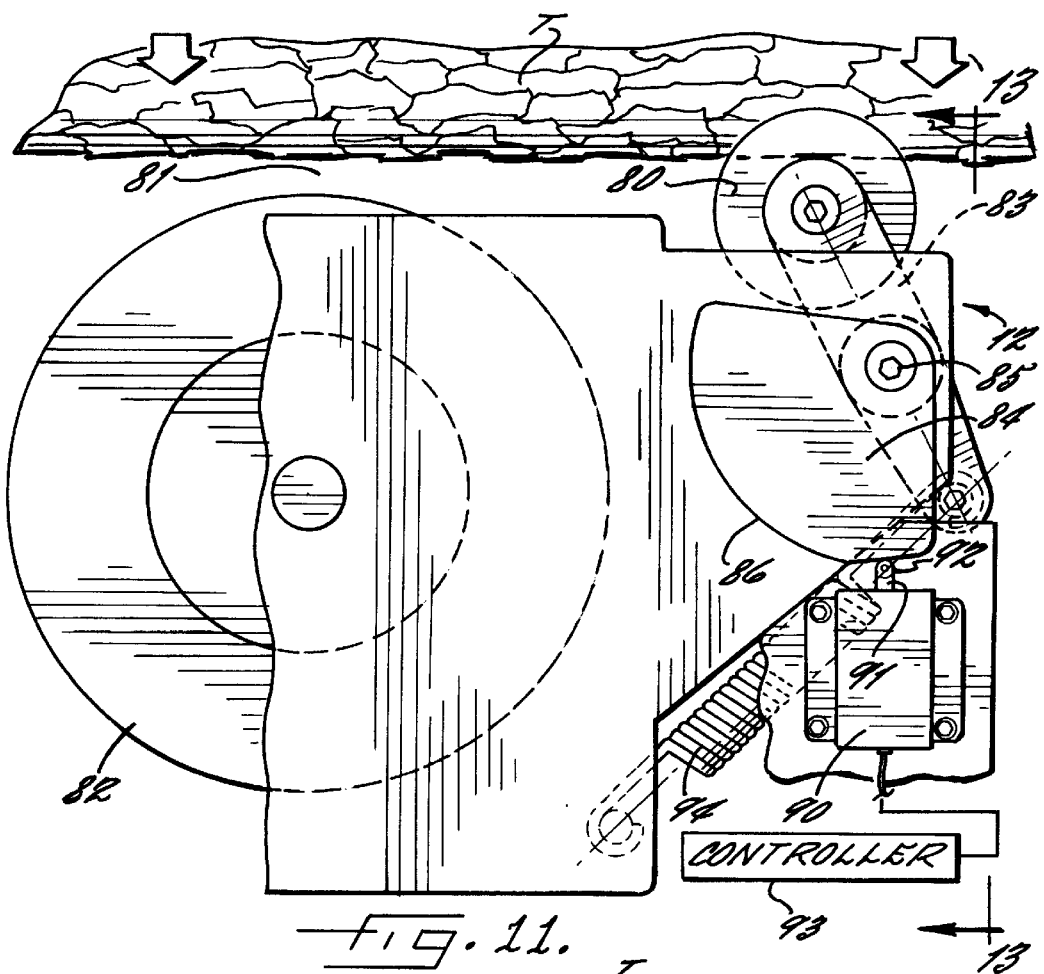
FIG. 11 is a first side elevation view of one embodiment of the tree stem sensing and cutting and stripping blade actuator means in an unloaded position, with a tree bole about to be placed thereon.
Figure 12:
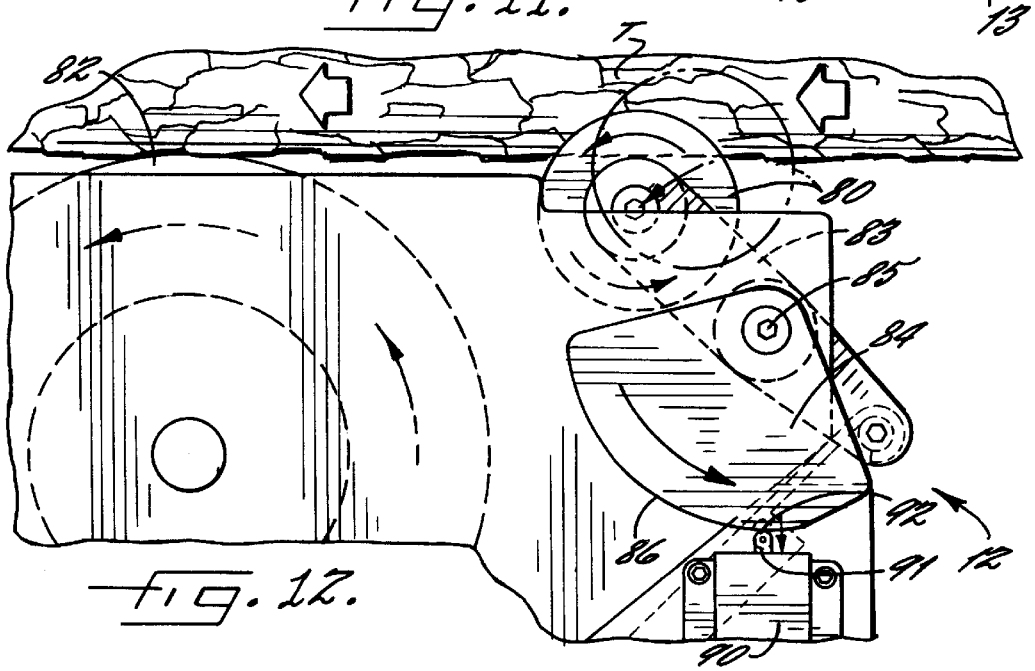
FIG. 12 is a second side elevation view of the embodiment for tree stem sensing means as shown in FIG. 11, but in which the tree stem has been placed on the sensing means.

For applications not including a topping saw, means may also be provided for detecting a portion of a tree stem T received in the tree path defined by the cutter head 12, for automatically closing the limb cutting and stripping blades 16 around the stem T when the stem T has been put in position by an operator, (i.e., lifted from the cutter head) and for opening the blades 16 when the stem T is removed by the operator. In a preferred embodiment shown in FIGS. 11, 12 and 13, a probe such as roller 80 protrudes into the tree path 81 defined by the cutter head 12. The probe 80 may be positioned closely adjacent to a tree support roller 82. The probe roller 80 extends via arms 83 which are pivotally mounted via pins 85 to the cutter head 12. A cam 84 is also mounted to a pin 85 for movement with the arms 83. The cam 84 includes an outer face 86 having a radius which varies relative to the pin 85. The cam 84 is rotated when the probe roller 80 is depressed by a tree bole T within the path 81.

A two-position hydraulic valve 90 is affixed to the cutter head 12 and includes a plunger 91, and preferably a roller 92, which follow the face 86 of the cam 84. Depression of the roller probe 80 and the consequent rotation of the cam 84 causes the plunger 91 to move, thus actuating the hydraulic valve 90. The hydraulic valve 90, or alternatively, electrical or other suitable switching means, functions via a controller 93 to control hydraulic or other systems for actuating the cylinders 66, or other drive means which are operatively connected to the blades 16. Thus, when the roller probe 80 is in a relaxed position having its surface slightly protruding above the face of the path 81 defined by the cutter head 12, the cylinder actuators 66 are retracted, thus holding the blades 16 in an open position for receiving a tree stem T. As the roller probe 80 is depressed and the cam 84 is consequently rotated, the hydraulic valve 90 and controller 93 cause the cylinders 66 or other drive means to move the blades 16 into contact with the surface of the tree bole T.

The probe 80 may be biased toward the tree path 81 by a spring 94 or other similar means which may extend between the arm 83 and the cutter head 12. In a preferred embodiment, the probe 80 extends about three inches above the cutter head 12 and into the tree path 81.

In a preferred embodiment, the opening and closing of the blades 16 is automatic. Thus, the blades 16 are closed by actuation of the roller probe 80 and rotation of the cam 84, so that the tree bole T may be pulled through the cutter head 12 until the size of the tree bole within the blades 16 reaches a sufficiently small diameter, or until some other point is reached at which the operator desires to remove the stem T from the cutter head 12. When the stem T is lifted from the tree probe 80, the blades 16 are opened.

Referring now to FIGS. 14–16, means for removably and pivotally mounting the cutter head 12 on the frame 11 may also be provided. This aspect of the invention is particularly desirable to facilitate easy transport of the cutter head, particularly when the unit includes a topping saw or other bulky attendant structures. As shown in FIGS. 14–16, a pivot axle 24 extends from each side of the pivot plate 22 underlying the cutter head 12. Axle 24 may include threads 94 for receiving a nut 95. A saddle 96 extends upwardly from each side of the frame 11 for receiving a portion of the axle 24. A saddle flange 97 extends laterally from the saddle 96, and the nut 95 includes a peripheral skirt 98 having a diameter for cooperating with a lower surface of the saddle flange 97. As illustrated in FIG. 16, when the nut 95 is threaded onto the threads 94 of the axle 24 while the axle 24 rests in the saddle 96, a portion of the skirt 98 underlies the saddle flange 97 to securely retain the axle 24 in position adjacent the saddle 96, thus retaining the pivot plate 22 and consequently the cutter head 12 in position on the frame 11.

In the drawings and specification, there have been disclosed typical and preferred embodiments of the invention. Although specific terms have been employed, they have been used in a generic and descriptive sense only and not for purposes of limitation, the scope of the invention being set forth in the following claims.

What is claimed is:

1. A tree stem diameter measuring device, comprising:

a frame;

a shaft mounted on said frame;

at least one lever for contacting a surface of a tree stem, said lever being rotationally mounted on said shaft so that a portion of said lever may move into contact with a surface of the tree stem;

a sliding position indicator having first and second slide members, said first slide member being fixedly mounted on said frame, and a second slide member connected to a portion of said lever such that said second slide member moves relative to said first slide member when said lever rotates about said shaft; and sensor means located on said sliding position indicator for detecting the relative positions of said first and second slide members.

2. A tree stem measuring device as described by claim 1, wherein said sensor means is magnetic.

3. A tree stem measuring device as described by claim 1, wherein said lever is a cutting and limb stripping blade in a tree delimbing device.

4. A tree stem measuring device as described by claim 1, wherein said sliding position indicator is mounted on actuator means for rotating said lever towards and away from a tree stem.

5. A tree stem measuring device as described by claim 4 wherein said actuator means is a hydraulic cylinder.

6. A tree stem measuring device as described by claim 1 wherein said first and second slides move in a linear path.

7. A tree stem measuring device as described by claim 6, further comprising a plurality of said sensor means for detecting a plurality of positions of said lever.

* * * * *